L. C. VANDERLIP.
VEHICLE STEERING MECHANISM.
APPLICATION FILED JAN. 29, 1921.
1,395,314.
Patented Nov. 1, 1921.
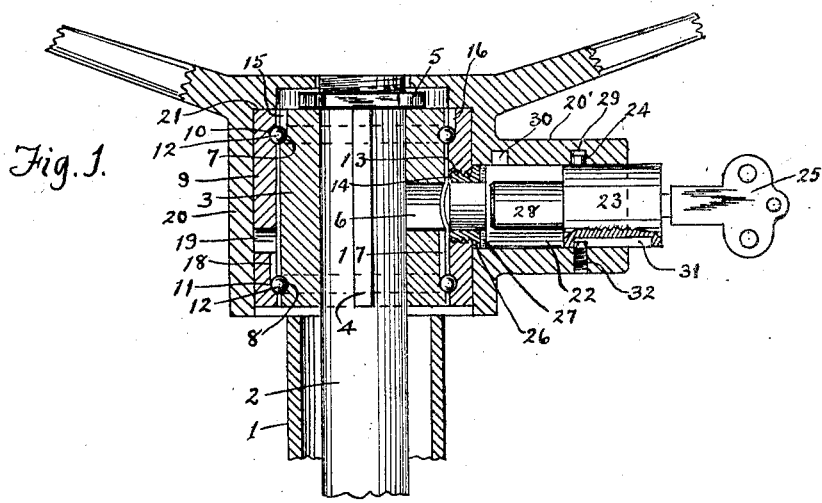
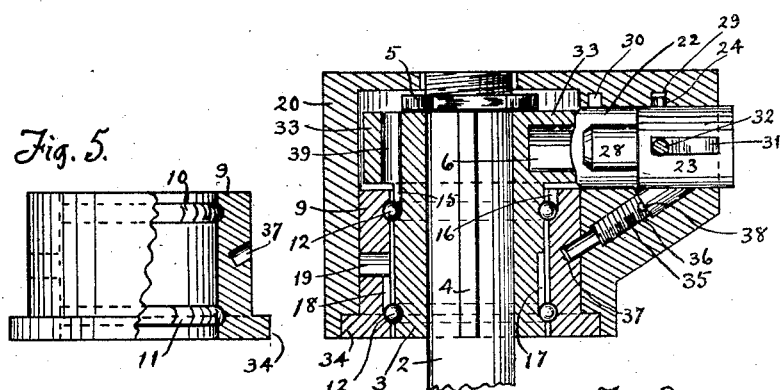
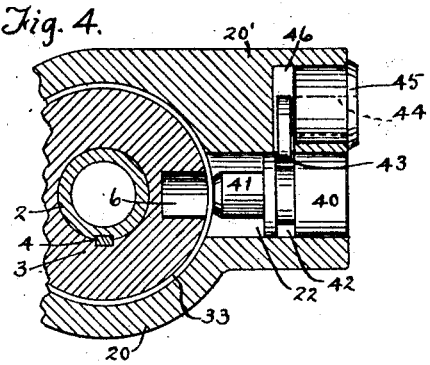
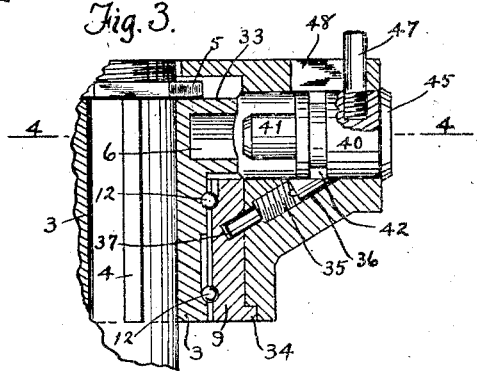
INVENTOR
Louis C. Vanderlip.

UNITED STATES PATENT OFFICE.

LOUIS C. VANDERLIP, OF ELKHART, INDIANA.

VEHICLE STEERING MECHANISM.

1,395,314.     Specification of Letters Patent.     Patented Nov. 1, 1921.

Application filed January 29, 1921. Serial No. 440,861.

*To all whom it may concern:*

Be it known that I, Louis C. Vanderlip, a citizen of the United States, residing in Elkhart, county of Elkhart, Indiana, have invented certain new and useful Improvements in Vehicle Steering Mechanism, of which the following is a specification.

This invention relates to vehicle steering mechanism and especially to steering wheel locking devices for motor vehicles.

An object of my invention is to provide a steering wheel locking mechanism in which the steering wheel or member is mounted upon anti-friction bearings. Another object of my invention is to provide a steering wheel locking mechanism in which the steering wheel may readily be mounted upon or dismounted from anti-friction bearings without disassembling the latter. A third object of my invention is to provide improved means for preventing the removal of the steering wheel from the steering post when the former is unlocked from the latter. Other objects of my invention are mentioned and described herein.

The preferred embodiment of my invention is illustrated in the accompanying drawing in which Figure 1 is a sectional side elevation of a steering wheel in fragment, steering post, and other members, to which my invention is applied; in which figure the steering wheel is shown independently rotatable on the steering post; Fig. 2 is a similar sectional view through a modification of my invention; Fig 3 is a similar sectional view through a fragment showing another modification of the invention; Fig. 4 is a section taken on the line 4—4 of Fig. 3; and Fig. 5 is a view of the ball bearing sleeve shown in Figs. 2 and 3.

Similar numerals of reference indicate like members throughout the several views on the drawing.

Referring to the details of the drawing, the numeral 1 indicates the usual hollow steering column within which the usual cylindrical, or any type of, steering post 2 is arranged, the latter being adapted for operative connection with the steering gear—not shown—of the vehicle, as is well known in the art. Numeral 3 indicates a hollow cylindrical driver hub rigidly mounted upon the top end of the post 2 to which it may be secured by a key 4 to prevent rotative movement thereof on said post. A nut 5 may be screw threaded upon the post 2 above the hub 3 to confine the latter against upward displacement from the post. The hub 3 may have a radially formed bolt socket 6 disposed intermediate the two circumferential grooves 7 and 8, usually termed ball races, formed in hub 3, as hereinafter described.

The numeral 9 indicates a hollow cylindrical ball bearing sleeve encompassing the hub 3, the bore of said sleeve being slightly larger than the exterior diameter of said hub, said sleeve bore having the two endless annular grooves, or ball races, 10 and 11 formed therein to coöperate with the hub races 7 and 8, respectively, to carry the anti-friction balls 12, a plurality of which are arranged in each of said ball race units. The sleeve 9 may be provided also with the aperture 13 arranged in a plane to register with the hub socket 6, but which is preferably larger in diameter than the socket 6 to receive the thimble 14, as hereinafter described.

Numerals 15 and 16 indicate upright slots formed, respectively, in the hub 3 and sleeve 9 and communicating, respectively, with the races 7 and 10 to enable introduction of a suitable number of the balls 12 into the coöperating grooves 7 and 10. The numerals 17 and 18 indicate upright slots formed, respectively, in the exterior of the hub 3 and bore of sleeve 9 and communicating, respectively, with the races 8 and 11 to enable the introduction of the balls 12 into the races 8 and 11 when the sleeve orifice 19, with which the slot 18 is in communication, is placed in communication with the slot 17.

The numeral 20 indicates a hollow steering wheel hub encompassing the sleeve 9 and provided with the interior shoulder 21 which may be engaged by the upper end of said sleeve for supporting the former. The hub 20 may have a laterally projecting bolt housing 20' which is provided with a chamber 22 in which the lock barrel 23 is slidably arranged, said lock barrel containing any preferred lock mechanism—not shown—whereby the laterally projecting movable pin 24 may be projected or withdrawn into the barrel at will by operating a key 25. The member 14 heretofore referred to is a tubular detent thimble which may have an annular flange 26, and to prevent removal of the wheel hub 20 from the sleeve 9, is screwed into the sleeve aperture 13, said thimble flange then projecting into the chamber 22, whereby said wheel hub is held against removal from said sleeve when the hub 20 is free to rotate around the driver hub 3. The thimble 14 may be provided with a radial slot 27 adapted to receive a tool, or screw driver, to actuate said thimble into or out of the aperture 13, which, obviously, can be accomplished only through the chamber 22 and when the latter is empty. The thimble 14 serves also to prevent rotative movement of the wheel hub 20 on the sleeve 9, thereby maintaining the registration of the chamber 22 with the sleeve aperture 13 and the bore of the thimble.

Numeral 28 indicates a reduced extension carried by the barrel 23 and adapted to be alternately moved through the bore of the tubular thimble 14 into and out of engagement with the hub socket 6 to effect a locked or unlocked relation between the wheel hub 20 and the driver hub 3. The lock barrel pin 24 is adapted to be engaged in either of two recesses 29 and 30 formed in the wall of the chamber 22, whereby the barrel 23 may be releasably locked in the position shown, or in the forward position—not shown—when the locking bolt 28 is in engagement with the bolt socket 6. The lock barrel 23 may have a longitudinal groove 31 which is coextensive in length with the interval between the recesses 29 and 30, said slot being normally engaged by a stop pin 32 which is removably screwed into the housing 20', whereby said barrel is prevented from rotation, and whereby the pin 24 automatically registers with either of the recesses 29 and 30 at the completion of either movement of said barrel, forward or backward.

In the modification shown in Fig. 2 the driver hub 3 is provided with an annular flange 33, below which flange the sleeve 9 is arranged, as heretofore described, said sleeve being slightly greater in diameter than said hub flange and having an annular flange 34 adjacent the lower end thereof, whereby the wheel hub 20 may be mounted upon said sleeve from above and supported by the sleeve flange 34 when thus mounted. In said modification the bolt socket 6 is formed in and radially of the hub flange 33 and functions as a socket for the bolt 28, as hereinbefore described. And in this structure (Fig. 2) the stop pin 32 and barrel slot 31 are shown disposed in a horizontal plane to enable the detent pin 35 to be arranged beneath the chamber 22, which detent pin serves as a substitute for the thimble 14 of Fig. 1. The pin 35 is screwed into a socket 36 formed angularly relative to the chamber 22 and from the interior thereof, the lower extremity of said pin socket registering with a recess 37 formed in the exterior periphery of the sleeve 9, the point of said pin projecting into said sleeve recess. The upper end of the pin slot 36 is covered and rendered inaccessible to unauthorized persons by the lock barrel 23 when the latter is retracted, as shown in Fig. 2, which effectively renders the detent pin 35 inaccessible at the time when the bolt 28 is disengaged from the socket 6. The pin 35 may have a slot 38 to receive a screw driver for actuating it. The hub flange 33 may have the vertical conduit 39 to enable the introduction of the balls 12 to the slots 15 and 16 for disposition within the ball races, as hereinbefore described.

In the modification shown in Figs. 3 and 4, another form of the locking means for locking the wheel hub 20 to the driver hub 3 is shown. In other respects the structure may be similar to that shown and described in Fig. 2. The modification shown in Figs. 3 and 4 contemplates a sliding locking bolt 40 arranged in the chamber 22, which bolt may be provided with a reduced end 41 adapted to engage the socket 6, for the purpose of locking the wheel hub to the driver hub, as hereinbefore described. The bolt 40 may have a circumferential groove 42 which is adapted to be engaged by the locking arm 43 mounted upon the end of the revoluble key barrel 44 mounted in the tumbler lock 45, the latter being suitably secured in a chamber 46 in the housing 20'. Thereby, the bolt 40 may be locked with the point 41 retracted from the socket 6. The bolt 40 is adapted to be manually actuated by a transverse pin 47 projecting through a slot 48 formed in the housing 20', in which slot said pin is longitudinally movable to enable the forward and backward movement of said bolt. Preferably, the pin 47 is removably screwed into the bolt 40 to enable removal of the bolt 40 to gain access to the detent pin 35. When the bolt point 41 is engaged with the socket 6 the lock arm 43 may be swung across the rear face of the bolt body 40 to prevent casual disengagement of the bolt point 41 from said socket. In this structure, as in that shown in Fig. 2, the detent pin 35 is rendered inaccessible to unauthorized persons and can be disengaged from the sleeve 9 only by a person having a key to the lock 45 who must first remove the bolt 40 from its chamber to expose the top end of the detent pin 35. The bolt pin 47 may serve also as a stop member, by engagement with the end walls of the slot 48, to limit the reciprocatory movement of said bolt and to effect registration of the groove 42 with the lock arm 43.

I claim:

1. In mechanism of the class described, a steering post; a sleeve element rotatably encircling said post; means for preventing relative axial movement of said sleeve element and post; a steering head fitted over said sleeve and removable therefrom; removable detention means engaging said sleeve element to prevent endwise movement of the steering head relative to said post, and means for releasably locking said steering head to said post.

2. In mechanism of the class described, a steering post; an encircling member rotatable thereon; means for preventing relative axial movement of said encircling member and post; a steering member fitted over said encircling member and removable therefrom; disengageable detention means connecting said encircling member with said steering member to prevent endwise movement of the latter relative to said post; and means for releasably locking said steering member to said post, said means rendering said detention means inoperable when said steering member is unlocked from said post.

3. In mechanism of the class described, a steering post; a driver hub secured to said post, said hub carrying a flange adjacent one end thereof; a sleeve encircling said hub beyond said hub flange and rotatable thereon; means for preventing relative axial movement of said sleeve and hub; a steering member removably fitted over said sleeve; disengageable detention means to prevent endwise movement of said steering member relative to said sleeve; and means for releasably locking said steering member to said hub flange.

4. In mechanism of the class described, a steering post; a driver hub secured to said post, said hub being provided with an extension; a sleeve rotatably encircling said hub beyond said hub extension; means for preventing relative axial movement of said sleeve and hub; a steering member removably fitted over said sleeve; disengageable detention means to prevent endwise movement of said steering member relative to said sleeve; and means for releasably locking said steering member to said hub extension.

5. In mechanism of the class described, a steering post; a driver hub secured to said post, said hub being provided with an extension; a sleeve element rotatably encircling said hub beyond said extension, said sleeve being somewhat greater in diameter than said hub extension; means for preventing relative axial movement of said sleeve and hub; a steering member removably fitted over said sleeve and adapted to be mounted thereon over said hub extension; and means for releasably locking said steering member to said driver hub extension.

6. In combination, a steering post; a driver hub thereon; a sleeve rotatable on said hub, said sleeve being provided with an aperture; means for preventing relative axial movement of said sleeve and hub; a steering member fitted over said sleeve; and a lock barrel provided with an extension which is adapted to be projected through said sleeve aperture into engagement with said driver hub to lock said steering member thereto.

7. In combination, a steering post; a driver hub provided with an extension, said hub being mounted upon said post; a sleeve rotatable on said hub; means for preventing relative axial movement of said sleeve and hub; a steering member fitted over said sleeve; and a lock barrel carried by the steering member and adapted to engage the driver hub extension to lock said steering member thereto.

8. In combination, a steering post; a driver hub secured thereto; a sleeve rotatable on said hub; means for preventing relative axial movement of said sleeve and hub; a steering member removably fitted over said sleeve; disengageable detention means to prevent endwise movement of said steering member relative to said sleeve; and a lock barrel carried by said steering member and adapted to engage said driver hub to lock said steering member thereto, said lock barrel being adapted also to render said detention means inoperable when said steering member is unlocked from said post.

9. In mechanism of the class described, a steering post; a sleeve encircling said post and rotatable thereabout; means for preventing relative axial movement of said sleeve and post; a steering head fitted over said sleeve and removable therefrom; disengageable detention means connecting said sleeve with said steering head to prevent endwise movement of the latter relative to said sleeve; and means for releasably locking said steering head to said post, said means rendering said detention means inoperable when said steering head is unlocked from said post.

10. In mechanism of the class described, a steering post; a sleeve encircling said post and rotatable thereabout; anti-friction bearing means for preventing relative axial movement of said sleeve and post; a steering head fitted over said sleeve and removable therefrom; disengageable detention means to prevent endwise movement of said steering head relative to said sleeve; and means for releasably locking said steering head to said post, said means preventing disengagement of said detention means when said steering head is unlocked from said post.

11. In mechanism of the class described, a steering post; an encircling element rotatable thereon; means for preventing relative axial movement of said encircling element and post; a steering element fitted over said encircling element and removable therefrom; desengagable detention means connecting said encircling element with said steering element to prevent endwise movement of the latter relative to said post; lock controlled means to enable actuation of said detention means; and means for releasably locking said steering element to said post.

12. In mechanism of the class described, a steering post; an encircling element rotatable thereon; means for preventing relative axial movement of said encircling element and post; a steering element fitted over said encircling element and removable therefrom; disengageable detention means connecting said encircling element with said steering element to prevent endwise movement of the latter relative to said post; and means for releasably locking said steering element to said post.

13. In mechanism of the class described, a steering post; an encircling element rotatable thereon; means for preventing relative axial movement of said encircling element and post; a steering element fitted over said encircling element and removable therefrom; means for releasably locking said steering element to said post; and means for preventing rotative movement of the steering element on said encircling element.

14. In mechanism of the class described, a steering post; an encircling element rotatable thereon and provided with an aperture; means for preventing relative axial movement of said encircling element and the post; a steering element fitted over said encircling element and removable therefrom; means carried by the steering element and movable through said encircling element aperture for releasably locking said steering element to said post; and means for preventing rotative movement of said steering element on said encircling element when the former is unlocked from said steering post.

15. In combination, a steering post; a driver hub rigid therewith; a sleeve rotatable about said hub; means for preventing relative axial movement of said sleeve and hub; a steering element fitted over said sleeve; and a lock barrel carried by the steering element for releasably locking the latter to said driver hub.

In testimony whereof I have hereunto affixed my signature this 27th day of January, 1921.

LOUIS C. VANDERLIP.